United States Patent [19]

Burke

[11] Patent Number: 4,673,450

[45] Date of Patent: Jun. 16, 1987

[54] METHOD OF WELDING TOGETHER GRAPHITE FIBER REINFORCED THERMOPLASTIC LAMINATES

[75] Inventor: James H. Burke, Valley Center, Kans.

[73] Assignee: The Boeing Company, Seattle, Wash.

[21] Appl. No.: 693,332

[22] Filed: Jan. 22, 1985

[51] Int. Cl.⁴ ............................................. B32B 31/22
[52] U.S. Cl. ................................ 156/153; 156/273.9; 156/274.4; 156/274.8; 156/308.2
[58] Field of Search ................. 156/153, 273.9, 274.4, 156/274.6, 274.8, 308.2, 308.4, 309.6, 313; 219/118

[56] References Cited

U.S. PATENT DOCUMENTS

| | | | |
|---|---|---|---|
| 2,423,922 | 7/1947 | Arndt, Jr. | 156/273.9 |
| 3,288,979 | 11/1966 | Mills et al. | 219/118 |
| 4,382,113 | 5/1983 | Schwartz et al. | 156/153 |
| 4,445,951 | 5/1984 | Lind et al. | 156/93 |

Primary Examiner—Donald E. Czaja
Assistant Examiner—Merrell C. Cashion, Jr.

[57] ABSTRACT

A method of welding together graphite fiber reinforced thermoplastic laminates. The process allowing immediate application of graphite thermoplastic materials for the building and assembly of primary and secondary structural parts used with aircraft airframes and similar structures.

5 Claims, 4 Drawing Figures

METHOD OF WELDING TOGETHER GRAPHITE FIBER REINFORCED THERMOPLASTIC LAMINATES

BACKGROUND OF THE INVENTION

This invention relates to a method of welding together plastic laminates, and more particularly, but not by way of limitation, to the welding together of graphite fiber reinforced thermoplastic materials such as polyether ether ketone, herein called Peek.

Heretofore, there has been no effective economical process for joining two or more laminates fabricated from graphite fiber reinforced thermoplastic materials. Such a process is required to allow the immediate application of joining together the materials for buildup and assembly of structural parts used with aircraft airframes or other applications. In the following United States Patents, various types of welding processes are disclosed using electrodes for joining together fusible material. They are:

U.S. Pat. No. 3,101,403
U.S. Pat. No. 3,288,979
U.S. Pat. No. 4,091,254
U.S. Pat. No. 4,343,982
U.S. Pat. No. 4,421,588.

None of these prior art patents specifically point out the unique features and advantages of joining together multilayer pieces of Peek material for the assembly of advanced thermoplastic structural parts.

SUMMARY OF THE INVENTION

This invention relates to a method of welding together graphite fiber reinforced thermoplastic laminates and more particularly, Peek material with graphite fiber.

The welding process allows for the immediate application of joining together two or more Peek laminates for use in aircraft airframes and similar structural parts.

Through the use of welding electrodes two or more Peek laminates can be joined together through the use of pressure and the proper voltage and amperage which generate enough heat between the two pieces of Peek material to create a spot weld or a continuous seam weld.

The method of welding together graphite fiber reinforced thermoplastic laminates such as Peek includes placing the two separate pieces to be welded together adjacent each other and applying pressure to the outer sides of the parts. A pair of electrodes are placed on the opposite outer sides of the parts to be welded. Proper and sufficient voltage and amperage are applied through the electrodes thereby generating a weld and joining the two parts together. To improve the bonding of the two parts the inner surfaces to be welded can include a single layer of Peek material or the surfaces to be welded can be applied having a roughed surface for increasing the bond area.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
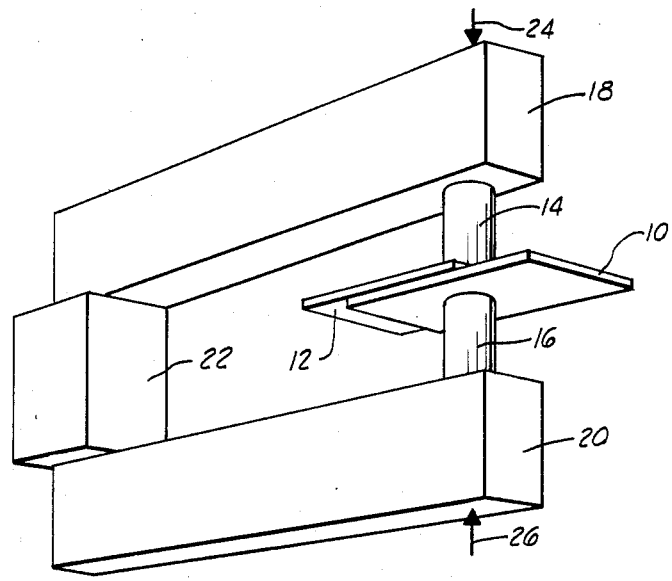
FIG. 1 illustrates a perspective view of two Peek laminates joined together between a pair of electrodes with pressure applied thereto.

In FIG. 1 two separate pieces of thick multilayer Peek laminate material are shown and designated by reference numerals 10 and 12. The two parts, 10 and 12, are placed between a pair of electrodes 14 and 16 which are held in place and perpendicular to the outer surfaces of the parts 10 and 12 by a pair of phenolic blocks 18 and 20 along with a spacer block 22. Pressure is applied to the blocks 18 and 20 along with a spacer block 22. Pressure is applied to the blocks 18 and 20 through the electrodes 14 and 16 onto the parts 10 and 12. The pressure indicated by arrows 24 and 26 is typically in the range of 50 to 100 pounds psi for applying pressure during the welding process.

Figure 2:
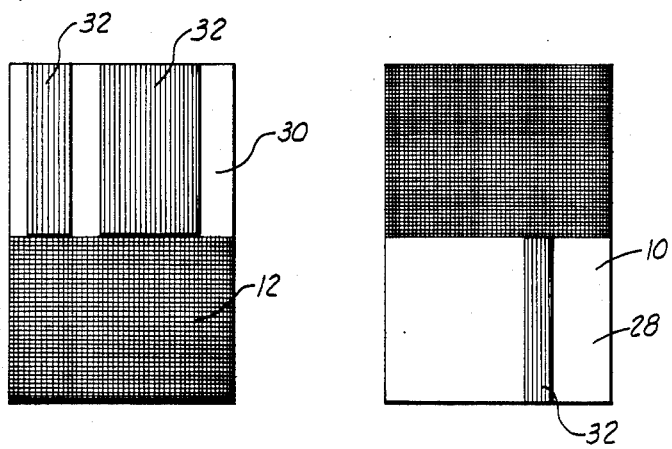
FIG. 2 illustrates the inner surface of the two parts to be welded having a roughed surface and additional single layers of Peek material.

In FIG. 2 the two parts 10 and 12 are shown with inner surfaces 28 and 30 sanded for providing a rough surface to aid in current conduction through the material. Also, one ply of Peek impregnated material shown as numeral 32 can be used to increase the resin richness, thereby allowing improved welding of the two parts 10 and 12 together.

Figure 3:
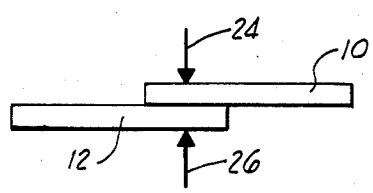
FIG. 3 illustrates a side view of the two parts to be welded together.
Figure 4:
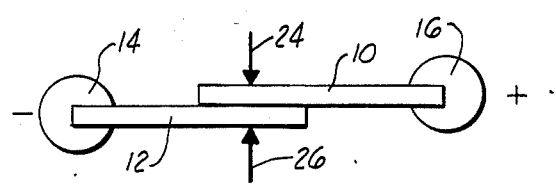
FIG. 4 illustrates the two parts to be welded together with the electrodes applied thereto.

In FIG. 3 and FIG. 4 the two parts 10 and 12 are shown with FIG. 4 illustrating the application of the electrodes 14 and 16. It has been found that a weld bond can be accomplished using voltage in the range of 20 to 40 volts and amperage in the range of 30 to 40 amps with a weld time of approximately 5 to 10 seconds. Using the voltage and amperage in this range with an appropriate weld time, good lamination in the weld area occurs. In bench test applications under tension the bonded weld of the two parts 10 and 12 have failed in a range of 900 pounds, which translates to approximately 5200 psi.

It should be appreciated by those skilled in the art of welding various types of composite structures that voltage, amperage and weld time in the range mentioned above can be varied accordingly with similar sucessful weld results.

Changes may be made in the construction and arrangement of the parts or elements of the embodiments as described herein without departing from the spirit or scope of the invention defined in the following claims.

What is claimed is:

1. A method of welding together parts formed of graphite-fiber reinforced polyetheretherketone laminates, comprising the steps of:
    disposing two said parts in surface contact between a pair of opposed electrodes;
    applying pressure through said electrodes to the area of said surface contact;
    applying voltage and amperage across said electrode sufficient to soften the polyetheretherketone in surface contact between said electrodes; and cooling said parts in said surface contact to form a weld.

2. The method of claim 1 further including the step of disposing a layer of polyetheretherketone between the area of surface contact of said parts prior to applying said pressure.

3. The method of claim 1 including the step of roughing the surface of each said part in the area of surface contact prior to disposing said parts in surface contact between said electrodes.

4. The method as described in claim 1 wherein the pressure applied to the electrodes is in a range of 50 to 100 psi.

5. The method as described in claim 1 wherein the voltage applied to the electrodes is in a range of 20 to 40 volts and the amperage in a range of 30 to 40 amps with a weld time in the range of 5 to 10 seconds.

* * * * *